Mar. 13, 1923.

G. H. RICKE.
WHEEL.
FILED SEPT. 19, 1921.

1,448,152.

INVENTOR.
George H. Ricke
by Johnson Strehli
ATTORNEY.

Patented Mar. 13, 1923.

1,448,152

UNITED STATES PATENT OFFICE.

GEORGE H. RICKE, OF CINCINNATI, OHIO, ASSIGNOR TO AARON McNEILL, OF CINCINNATI, OHIO.

WHEEL.

Application filed September 19, 1921. Serial No. 501,767.

*To all whom it may concern:*

Be it known that I, GEORGE H. RICKE, a citizen of the United States, residing at the city of Cincinnati, in the county of Hamilton and State of Ohio, have invented certain new and useful Improvements in Wheels, of which the following is a specification.

My invention herein set forth, belongs to that class of wheels used more particularly in connection with roller skates, skate-mobiles and kindred articles of manufacture.

The object of my invention is to produce a wheel of this class which shall be cheap of manufacture, simple in construction, highly efficient in use and which shall possess a marked degree of utility; its peculiar construction enabling me to cut the noise and clatter made by these wheels to a minimum, to give ease and smoothness of operation, to furnish a maximum degree of resiliency and cushion effect commensurate with articles of this class and their efficient use, and to allow their use with more convenience and satisfaction to the user.

Its various features and advantages will readily become apparent from the following specification.

In the accompanying drawing, forming part of this specification:

Figure 1:
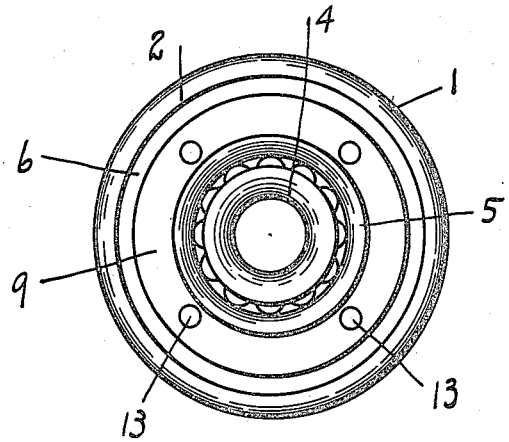
Fig. 1, is a view of the wheel in side elevation.
Figure 2:
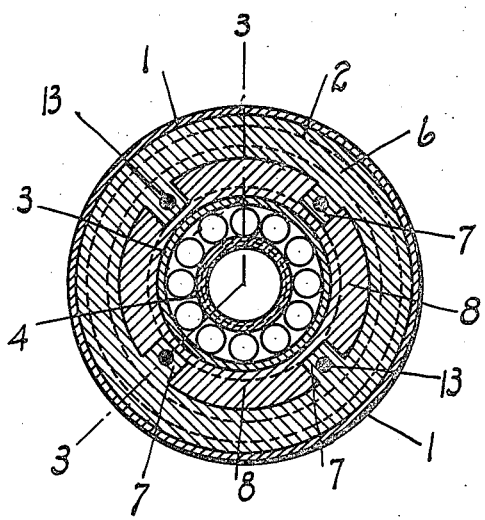
Fig. 2, is a sectional view, taken on the line 2—2 of Fig. 3.

The wheel or roller is formed essentially of a peripheral metal rim and an inner metal rim, between which are interposed an annular or ring like band of resilient material which hugs the outer peripheral metal rim and an annular or ring like band or filler of wood or like material between the resilient ring and the inner rim, held together in a desirable manner.

The outer peripheral rim, band, or tire tread of the wheel or roller is marked 1, having side edge flanges or retaining walls as 2, 2, and preferably rounded at its peripheral edges; the inner rim or band is generally made of two halves 3 and 4 generally of a U shape in cross section with side curved edges 5, as shown, when put together. The resilient ring or band is marked 6, and is usually made of rubber and is provided with lugs or extensions 7 made integral therewith; this band 6 may be made of any material found desirable. The filler block or ring is marked 8 and is preferably made of wood or a similar material; this wooden filler is notched out to allow the lugs or extensions 7 to fit therein to keep the parts in alignment and prevent undue play. A flange 9 is placed on each side of the wheel as shown to retain the parts in normal position. To better retain the resilient ring or band 6 and the filler block 8 in proper position and alignment, it will be noticed that the side edges 2, 2, of the tire tread 1 extend down some distance over the side faces of said resilient band 6 and that the side flanges 9, 9, extend entirely over the side faces of the filler block 8 and partly over the side edges of the resilient band 6, beyond the point between the said resilient band and the filler block.

Figure 3:
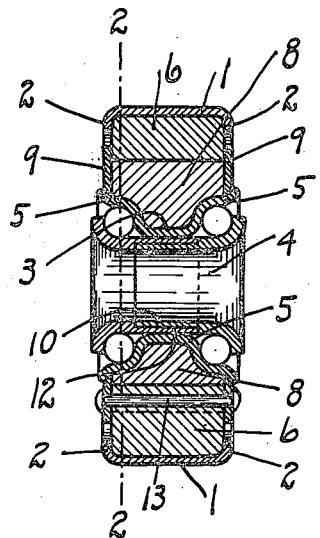
Fig. 3, is a sectional view, taken on the line 3—3 of Fig. 2.

In the center, the axle bearing for the wheel is formed of a thimble having outwardly flaring edges, formed of the two thimble parts 10 and 12, the part 10 being partly cut away or shouldered to enable part 12 where it is cut away or shouldered to pass over the said cut away or shouldered part of said thimble part 10, so that a flush axle bearing is formed, (see particularly Fig. 3).

Between the thimble parts 10 and 12 and the outer edges of parts 3 and 4, which make the inner rim, at their edges 5, a raceway is formed, into which a multiplicity of balls are placed to form a ball bearing wheel or roller.

Bolts or screws as 13 are used to assist in holding the parts together, and any other means may be employed to keep the parts in a normal assembled position and condition.

It will be understood that the resilient band and the filler block may be of any size and of any contour and made in any desired manner.

It will be noted that by my improved construction, the tread of the wheel being formed of a metal band placed onto a resilient ring or band, the wheel in rolling over the floor or pavement will not produce that harsh clatter and noise incident at present to wheels of this character and a certain amount of cushion effect is possible, thus a great deal of the noise is eliminated, ease of operation is attained, and many of the shocks are absorbed and do not reach the foot and body of the user.

The filler block, inner rim, axle thimble, roller bearing and their connecting parts form the body of the wheel or roller and the resilient ring or band and its metal tire form the wheel tread.

I wish to be understood as claiming that the parts may be made of any material other than herein specifically set forth and the parts arranged and connected together in any modified form other than herein specifically set forth, without departing from the spirit of the invention as herein set forth.

What I claim as new and my invention and desire to secure by Letters Patent is:

In a wheel of the class described, a body part provided with a filler block, a peripheral resilient band surrounding said filler block at its periphery and a metal tire around the peripheral face of said resilient band, said metal band extending partly over onto said resilient band, washers on each side of the body part and extending beyond the meeting edges between the said resilient band and said filler block.

In testimony whereof, I affix my signature at Cincinnati, Ohio, this 14th day of September, 1921.

GEORGE H. RICKE.